United States Patent
Gabelmann et al.

[19]

[11] Patent Number: 5,844,131
[45] Date of Patent: Dec. 1, 1998

[54] TIRE PRESSURE SENSOR APPARATUS FOR A PNEUMATIC TIRE OF A VEHICLE

[75] Inventors: Volker Gabelmann, Niederstotzingen; Rolf Reinhardt, Giengen, both of Germany

[73] Assignee: Alligator Ventilfabrik GmbH, Germany

[21] Appl. No.: 666,881

[22] Filed: May 25, 1996

[30] Foreign Application Priority Data

Jun. 26, 1995 [DE] Germany .................. 195 22 567.8

[51] Int. Cl.⁶ .................................................. B60C 23/00
[52] U.S. Cl. ............................................................. 73/146.8
[58] Field of Search ............................... 73/146.8, 146.5; 340/445, 442, 443, 447; 364/558

[56] References Cited

U.S. PATENT DOCUMENTS 4,763,517 8/1988 Feinberg ................................ 73/146.8
5,083,457 1/1992 Schultz ................................... 73/146.5

*Primary Examiner*—William L. Oen
*Attorney, Agent, or Firm*—Bachman & LaPointe, P.C.

[57] ABSTRACT

In an apparatus for measuring the tire pressure in a pneumatic tire of a vehicle by means of a measurement value sensor, which is acted upon by the tire pressure, on the rim bed (12) of a rim (10), which accommodates a tire valve (20), for the pneumatic tire, connected to the tire valve (20) is a signal housing (44) which is associated with the rim bed (12) and which includes an electronic sender means as the measurement value sensor for the tire pressure. The signal housing (44) is connected to the tire valve (20) by a hollow screw (40) which engages into the valve bore (28) and is adjustable relative thereto in such a way that the tire valve/signal housing combination can be used for equipping different rim cross-sections. That purpose is also served by base elements (52) which project from the underneath surface of the signal housing (44) and which sit on the rim bed (12) and which with the suspension point on the screw (40) form a multi-point mounting configuration.

28 Claims, 8 Drawing Sheets

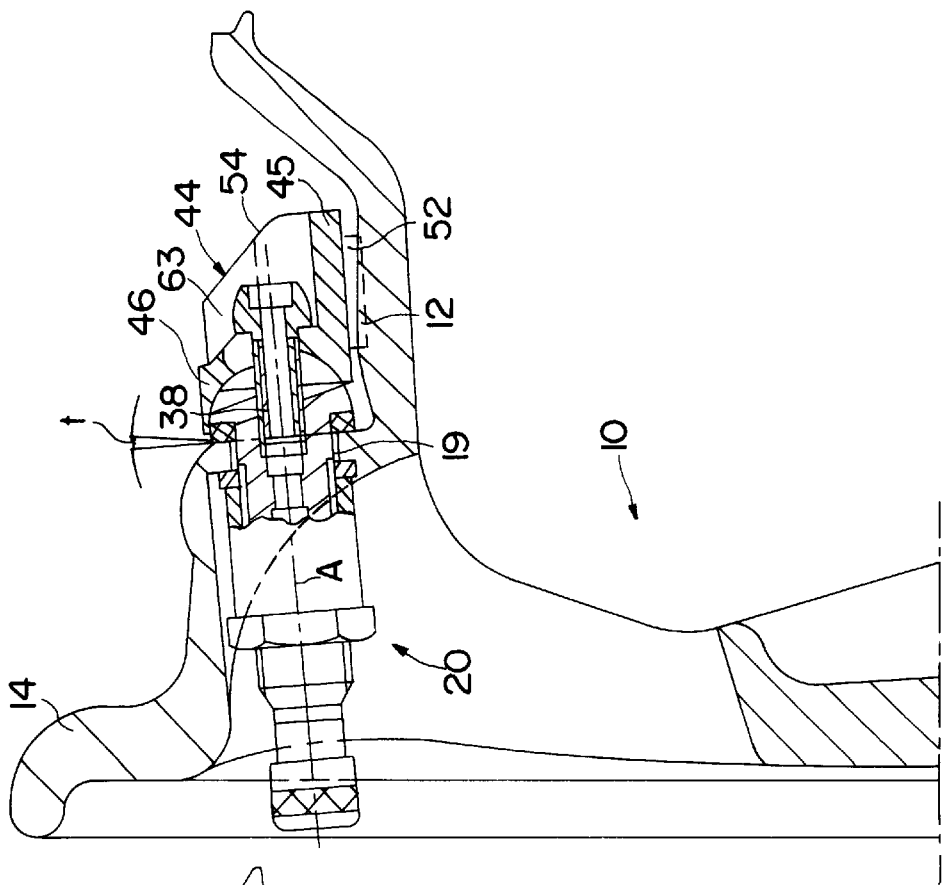
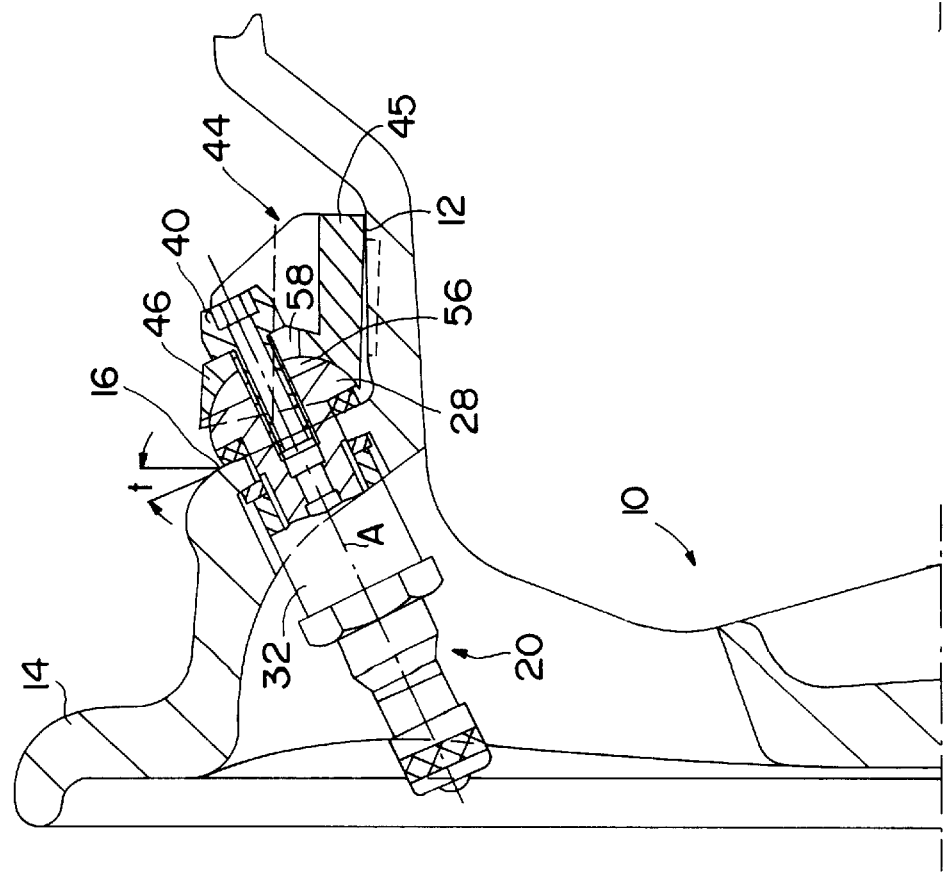

TIRE PRESSURE SENSOR APPARATUS FOR A PNEUMATIC TIRE OF A VEHICLE

BACKGROUND OF THE INVENTION

The invention concerns an apparatus for measuring the tire pressure in a pneumatic tire of a vehicle by means of a measurement value sensor, which is acted upon by the tire pressure, on the rim bed of a rim, which accommodates a tire valve, for the pneumatic tire, outside of which tire a receiver is associated with the measurement value sensor.

An apparatus of that kind is described in the applicants' German laid-open application (DE-OS) No 37 34 053; a bellows is arranged in the pneumatic tire, in a direction of movement which is approximately parallel to the axis, and is connected to a permanent magnet which is displaceable in parallel relationship to the axis on the outside of the tire in dependence on the tire pressure and which alters its measurable position upon deviations from the normal tire pressure. An electronic component is proposed as the stationary pick-up outside the pneumatic tire; by virtue of the so-called Hall effect, the electronic-component produces in each case a voltage perpendicularly to a flowing current and a magnetic field. The above-mentioned Hall effect is based on the notion that, in electrical conductors which are disposed in a homogeneous magnetic field and in which an electric current flows perpendicularly thereto, a voltage difference is produced, perpendicularly to the magnetic field and perpendicularly to the current. The magnitude of that effect is dependent on the conductor material and is characterized by the respective Hall constant.

Practice has now shown that, in the case of a measurement value sensor which rotates about the wheel axis, as a consequence of frictional forces, caused by the centrifugal force which occurs, as between the bellows or the holder of the permanent magnet on the one hand and the pressure tube on the other hand, the axial movement of the permanent magnet which is required for measurement purposes can be disturbed, a hysteresis effect occurs. The latter hinders fulfilling the requirement for a linear relationship, which is independent of speed of rotation, as between the tire pressure and the movement of the measurement value sensor.

SUMMARY OF THE INVENTION

In consideration of that state of the art the inventor set himself the aim of improving tire pressure monitoring in pneumatic tires of motor vehicles and in particular simplifying fitting of the measurement value sensor in the region of the rim. The invention further seeks to ensure operational reliability thereof even when the vehicle tire is changed.

That object is attained by the teaching of the present invention.

In accordance with the invention, connected to the tire valve which passes through the rim is a signal housing which is associated with the rim bed and which contains an electronic sender means as the measurement value sensor for the tire pressure, preferably together with a battery as a power source; then, associated with that measurement value sensor, outside the pneumatic tire, is the receiver which receives and evaluates the signals from the measurement value sensor.

In accordance with a further feature of the invention the signal housing is connected to the tire valve by a connecting element, in particular a hollow screw which is fitted into the valve bore of the tire valve, and is adjustable relative thereto. That adjustability option is required in order to provide for an advantageous position of the signal housing on the side wall of the rim bed and in addition to provide for adaptation to the different angles of inclination of the rim bed side wall in the case of different types of rim.

In accordance with the invention the signal housing is fixed to the valve base by the head of the screw bearing against the side, which is remote from the valve, of a longitudinal wall of the signal housing, the screw passing with clearance through the longitudinal wall of the signal housing. The signal housing is therefore held in clamping relationship between the screw head and the side wall of the rim.

In a configuration according to the invention the longitudinal or rear wall of the signal housing, or a transverse wall which is disposed in front of that wall in parallel relationship, has a slot extending parallel to the end faces of the housing, for receiving the hollow shank of the screw; the latter can therefore be adjusted within the slot transversely to the rim bed.

The suspension for the signal housing on the screw is preferably part of a kind of three-part mounting; provided on both sides of the screw are base elements which in the installation position are seated on the rim bed. Their free height is such that the portion of the rim bed which is present between them and which is of a curved cross-section always remains at a spacing relative to the underneath surface of the signal housing; that ensures that the signal housing is securely supported.

Preferably the base elements, for example in the form of bar portions which are directed in parallel relationship with the screw shank which extends centrally between them, are formed on the signal housing near the narrow sides thereof; in other words, a structural plane which is passed through the axis of the screw shank and which crosses the underneath surface of the signal housing is to form the center of the above-mentioned three-pointed mounting.

It has been found desirable if the side of the transverse wall, which is remote from the valve, defines an apex groove with its groove walls, the apex groove extending from a side surface of the signal housing, in other words, that apex groove is a blind passage which is open upwardly and to a side surface, for receiving the screw head.

Disposed at the side surface of the signal housing, which is near to the valve, is a cavern or cavity which is formed in the signal housing on the line of symmetry thereof and which crosses the longitudinal axis of the tire valve and in which the base of the tire valve is movably mounted. If the cavity is delimited for example by a part-spherical surface, in particular a hemispherical surface, it will be seen therefore that a part-spherical peripheral surface of the base of the tire valve can be turned virtually as desired within the cavity and thus adapted to the parameters and factors involved.

In accordance with the invention however the cavity can also be in the form of a slot with part-spherical surfaces arranged at two sides, sideways, and then a valve base which is milled flat at both sides and which is part-spherical at two oppositely disposed sides can then be fitted into that slot. The milled flank surfaces serve as a means for preventing rotational movement, just like a central rib in the interior of the cavity in another design configuration; that rib is fitted into a corresponding groove in the base of the valve and prevents it from rotating.

The described cavity, and the apex groove which is disposed opposite it on the other side of the transverse wall, is desirably provided in a projecting portion formed on the signal housing; the projecting portion formed on the signal housing projects upwardly centrally from a cuboidal base portion and extends on the above-mentioned center line or line of symmetry. The lateral outside surfaces of the projection portion formed on the housing are inclined towards each other in a direction away from the base portion in order to help to save weight of the signal housing.

Insertion spaces for a power source and for the electronic signal means extend away from the bottom surface of the described signal housing, in weight-symmetrical relationship with the above-described central line. The electronic means picks up the fluctuations in pressure which possibly occur in the interior of the tire and outputs a corresponding signal to the above-mentioned receiver.

The signal housing is formed from a light tough plastic material and, as already mentioned, can be adapted in terms of its position to the respective parameters of the rim. For that purpose for example the rear surface of the signal housing, which is near to the valve, is inclined in an outward direction away from the bottom surface, and thus can desirably be applied against the side wall, which is also inclined, of the rim bed.

The feature that the front surface of the signal housing, which is parallel to the rear surface, extends in the same direction as the rear surface or is inclined at a larger angle, like also possibly upwardly inwardly inclined narrow sides, does not serve to provide the above-mentioned positional adaptation effect, but serves to provide protection from fitting tools; when the tires are removed, spatula-like irons are inserted between the tires and the rim. The tools engage over the inserted signal housing or slide past same. The same applies for the bead of the pneumatic tire which is associated with the side wall of the rim, when the tire is being removed/fitted. The rounded edges and the inclinedly disposed surfaces prevent damage to the signal housing and also prevent damage to the tire bead.

Particular relationships in terms of the size of the signal housing whose length is to measure between 50 mm and 70 mm, preferably about 60 mm, are in accordance with the invention. The relationship of its width to its length should advantageously range approximately between 1:2 and 1:3, while the relationship of the overall height to that length should range between about 1:3 and 1:4. Finally a relationship of the projection height of the base elements or bar portions relative to the housing length of in particular 1:16 is preferred.

Overall the invention provides an accessory for rims which are to be provided with a tire pressure monitoring system, the accessory attaining the object envisaged by the inventor in a beautifully simple fashion.

Particular protection is sought for the combination of a tire valve with the discussed signal housing.

BRIEF DESCRIPTION OF THE DRAWINGS

Further advantages, features and details of the invention are apparent from the following description of preferred embodiments and with reference to the drawing in which:

FIGS. 6 and 7 are views corresponding to FIG. 1 of further embodiments.

DETAILED DESCRIPTION OF PREFERRED EMBODIMENTS

Figure 1:
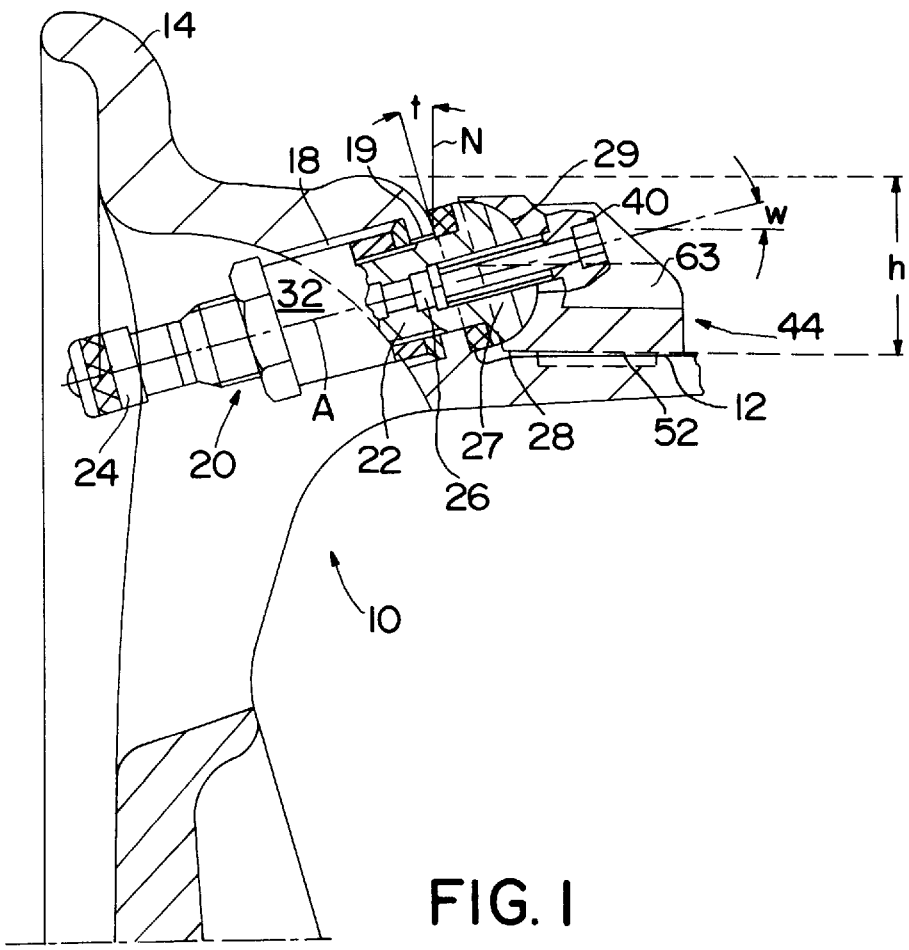
FIG. 1 is a partial view in cross-section through a rim for a vehicle tire with tire valve and a signal housing which is fixed thereon.

FIG. 1 shows a part of a rim 10 which is pressure die cast from an aluminum alloy, for a motor vehicle wheel (not shown), with a rim flange 14 which projects above a rim bed 12. A valve hole 18 for a tire valve 20 is formed in the outer side wall portion 16 of the rim bed 12 in such a way that its longitudinal axis A extends at a conventional angle of inclination w of 15° relative to the axis of the wheel. The height h of the side wall 16 can be of different dimensions, like the angle of inclination w to which the angle t of the side wall relative to the line N normal to the axis corresponds. In FIG. 6 that angle measures about 25° while in FIG. 7 it is only 5°.

The tire valve 20 has in a valve body 22 of an aluminum alloy which is coated, for example anodized, a valve insert (not shown) with axial valve bore, a valve cap 24 fitting over the valve insert. The valve body 22 is provided with an axial bore 26 and at the end remote from the valve cap 24, the valve base, it is provided with a radially projecting collar 28 which provides a spherical peripheral surface 29. Between the collar 28 and a disk 34 which is supported against a screw sleeve 32 the edge 19 of the valve hole 18 bears snugly against an elastic ring 36.

Screwed into the bore 26 is a hollow shank 38 of a screw 40 having a polygonal recess therein. The head 42 of the screw 40 which extends the cavity 39 in the hollow shank 38 and which provides a polygonal hole 41 presses a so-called signal housing 44 against the valve collar 28.

Figure 2:
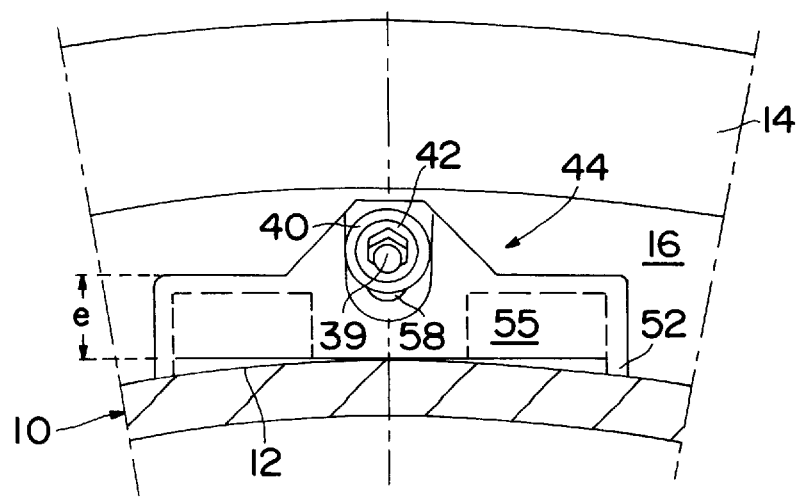
FIG. 2 is a front view, towards the valve, of the signal housing, in a portion of FIG. 1.
Figure 3:
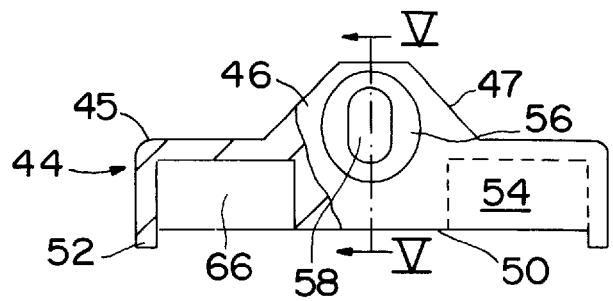
FIG. 3 is a partly sectional rear view of the signal housing.
Figure 4:
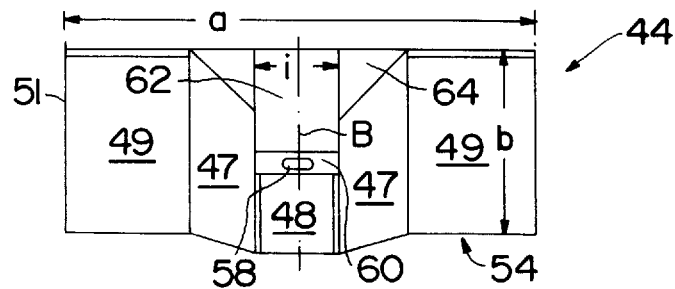
FIG. 4 is a plan view of the signal housing.
Figure 5:
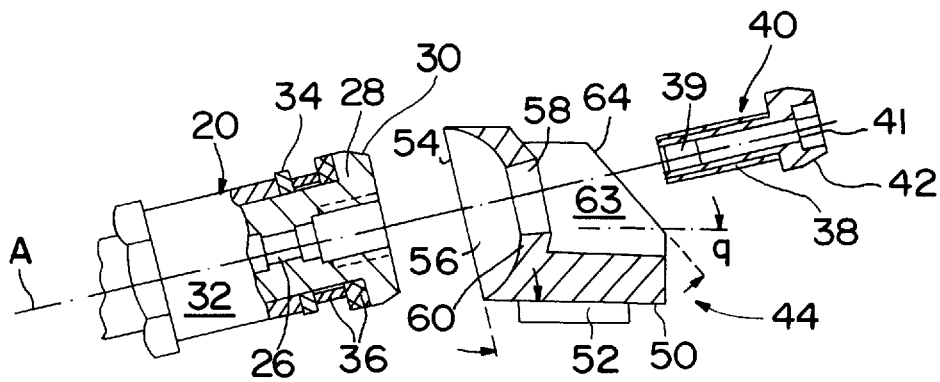
FIG. 5 is a cross-section through FIG. 3 along line V—V thereof with valve members associated with the signal housing.
Figure 8:
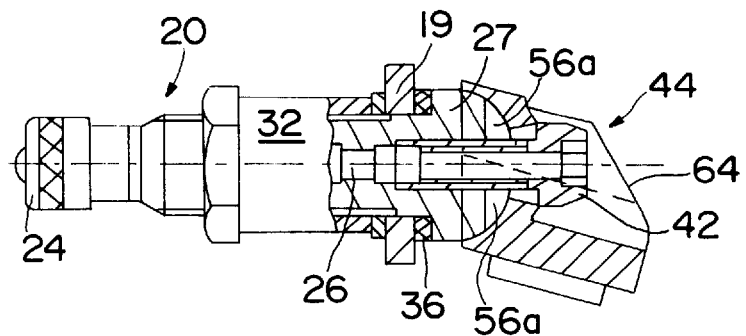
FIGS. 8 and 10 are partly sectional side views of tire valves with a signal housing.
Figure 9:
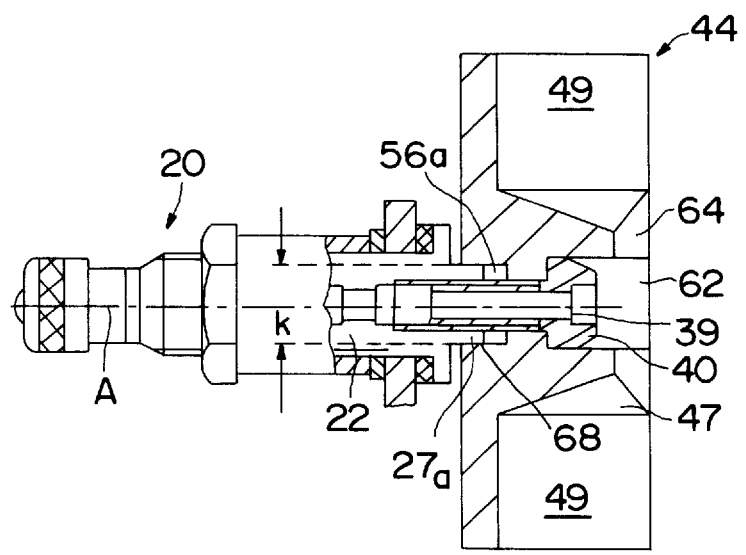
FIGS. 9 and 11 are each a partly sectional plan view of FIG. 8 and FIG. 10 respectively.

The signal housing 44 is formed or molded from a light plastic material which is stable in respect of shape and, in the construction shown in FIGS. 2 through 4, comprises a cuboidal base portion 45 of a length a of 50 mm, a-greatest width b of 20 mm and a base height e of 10 mm, as well as a projection portion 46 which rises up on the central line B of the base portion 45, which central line in the installation position crosses the longitudinal axis A of the tire valve 20 at a right angle in plan view. The projection portion 46 has flank surfaces 47 which are inclined towards each other and therebetween a head surface 48 which extends parallel to shoulder surfaces 49 of the base portion 45 and to the bottom surface 50 thereof. Base bar portions 52 project away from the bottom surface 50, prolonging two narrow sides or end faces 51 of the base portion 45. The bar portions 52 rest on the rim bed 12 in the installation position diagrammatically shown in FIGS. 1 and 2.

The longitudinal wall which in the installation position is towards the side wall portion 16 of the rim 10, as the rear surface 54 of the signal housing 44, is inclined relative to the bottom surface 50 at an angle f of 75°. Thereon, provided in the projection portion 46 on the housing is a cavern or cavity 56 of approximately part-spherical shape, from which extends a slot 58 which is arranged in a thin transverse wall 60 of the projection portion 46 of the housing; the transverse wall 60 extends parallel to the inclined rear surface 54.

The transverse wall 60 separates the cavity 56 from an apex groove 62 which is provided centrally in the projection portion 46 of the housing and which is of a width i of 8 mm in this case. The walls 63 of the groove 62, which flank a rounded groove bottom, are directed parallel to the center line B. The groove walls 63 terminate at inclined surfaces 64 of the projection portion 46 of the housing; those inclined surfaces 64 whose angle of inclination is 45° go into the other longitudinal wall, the front surface 55, of the signal housing 44.

Arranged on each of the two sides of the groove 62, in the base portion 45, and extending from the bottom surface 50, is a respective insertion space 66 which is circular in plan view, of a diameter d of about 15 mm; the signal housing 44 serves for receiving, close to the valve, a baby cell or miniature battery, and an electronic sender means: these two inserts are not shown in the drawing for reasons of enhanced clarity thereof. A baby cell 67 is only shown in FIG. 13, in a round insert space 66$_a$.

The signal housing 44 is fixed by means of the hollow screw 40 to the tire valve 20 and thus to the rim bed 12 and can also adapt to side wall portions 66 of different angles t, in particular by virtue of the part-spherical configuration with the negative part-spherical surface and the co-operating portion, the peripheral surface 30 of the valve collar 28; this can be clearly seen in particular from the comparative views in FIGS. 1, 6 and 7. The different positions of the hollow shank 38 in the slot 58 in the extreme positions in FIGS. 6 and 7 will also be clearly evident.

The described manner of suspending the signal housing by means of the screw 40 which preferably comprises nickel-plated steel forms, with the two base bar portions 52 which rest on the rim bed 12, an operationally reliable three-point fixing for the signal housing 44.

FIGS. 8 through 18 of the drawing show further embodiments of the pairing consisting of the tire valve/signal housing. Lateral surfaces 68 are formed by milling on the valve base 27$_a$ in FIGS. 8 and 9. Here the cavity 56$_a$ of the signal housing 44 is a slot of a width k with part-spherical surfaces provided at top and bottom; the valve base 27$_a$ is non-rotatably mounted therein.

Figure 10:
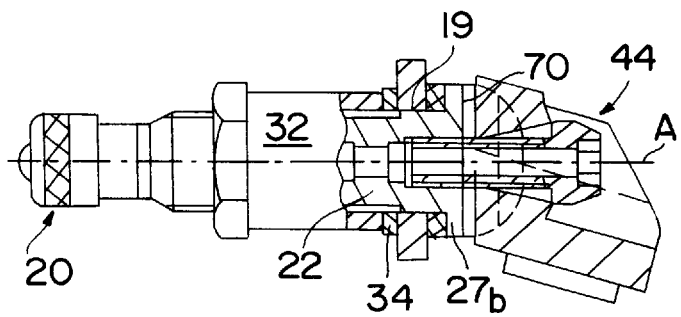
Figure 11:
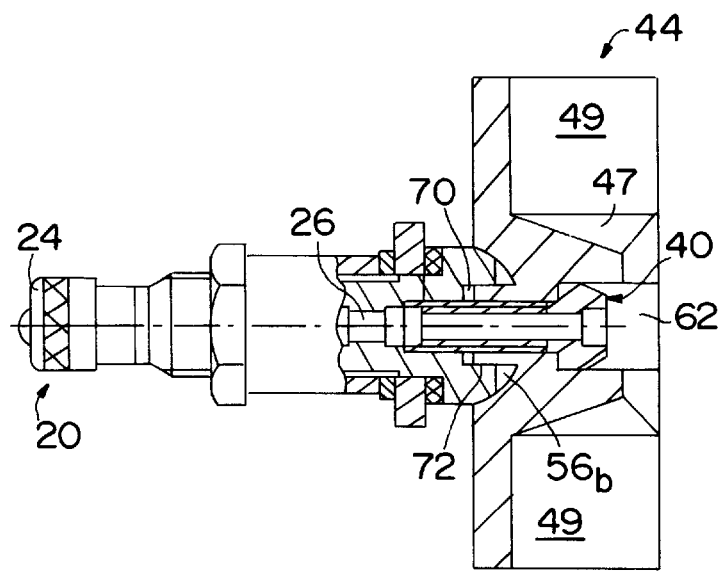
Figure 12:
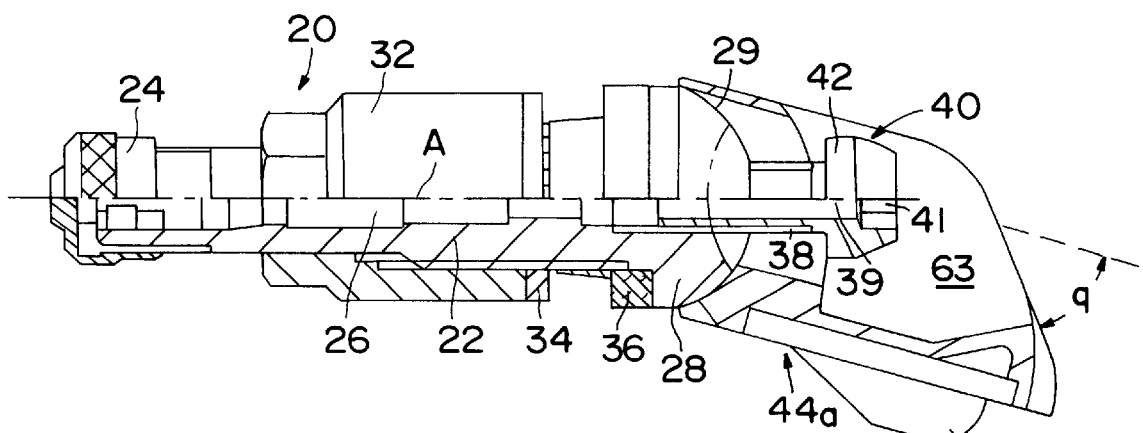
FIG. 12 is a partly sectional side view of another embodiment of the signal housing with tire valve.

In the embodiment shown in FIGS. 10 and 11, to provide a non-rotatable mounting, disposed in the valve base 27$_b$ is a groove 70 into which a rib 72 of the signal housing 44 engages. The screw 40 passes through the rib 72. The rib 72 projects into the cavity 56$_b$.

The length a of the signal housing 44$_a$ in FIGS. 12 through 18 measures about 63 mm, its greatest width b here is about 32 mm with an overall height e$_1$, without the base bar portions 52$_a$ which are here wing-like, of 17 mm; the height z of the base bar portions 52$_a$ is 4 mm with a length g of 15 mm.

The end faces 51$_a$ of the signal housing 44$_a$ which is preferably shaped or molded from plastic material are here curved upwardly inwardly at an angle of about 35° relative to the vertical, the angle of inclination y of the front surface 55 is about 37°.

Figure 13:
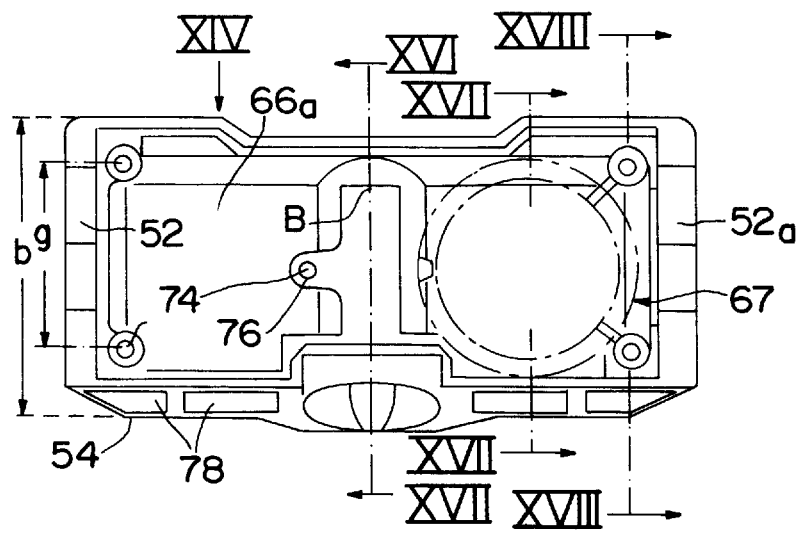
FIG. 13 is a plan view of the underside of the signal housing of FIG. 12.
Figure 14:
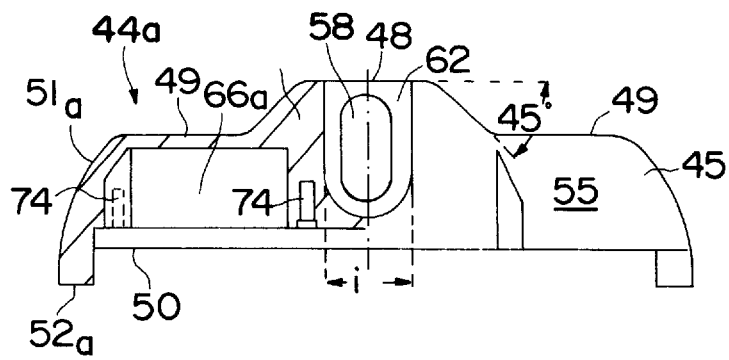
FIG. 14 is a partly sectional rear view of the signal housing indicated by arrow XIV in FIG. 13.
Figure 15:
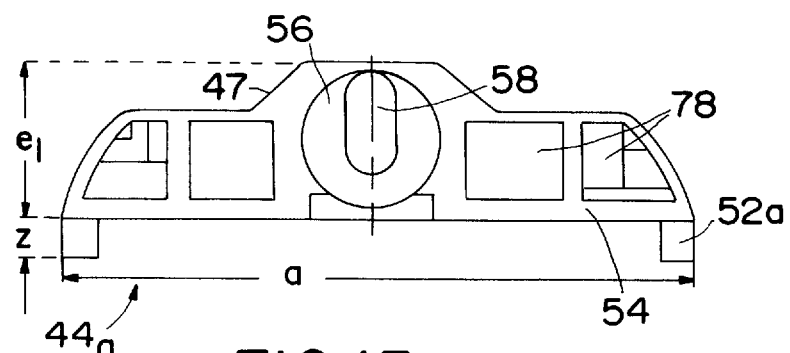
FIG. 15 is a front view of the signal housing of FIGS. 13 and 14, FIGS. 16 through 18 are views in cross-section through the signal housing taken along lines XVI—XVI, XVII—XVII and XVIII—XVIII respectively in FIG. 13, and FIGS. 19 through 21 show a portion from FIG. 7 with three different positions of a pneumatic tire on the rim.
Figure 16:
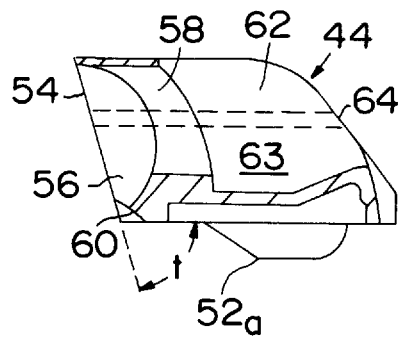
Figure 17:
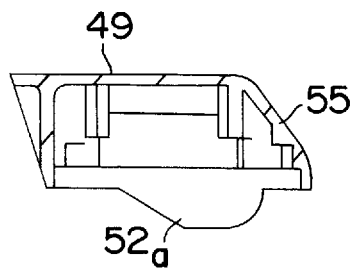
Figure 18:
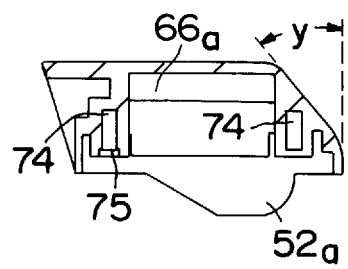

FIG. 13 shows sleeves 74 formed on the arrangement in the insert spaces 66$_a$ with screw holes 76 for the electronic parts to be installed, while FIG. 15 also shows window configurations 78 formed in the rear surface 54.

Figure 19:
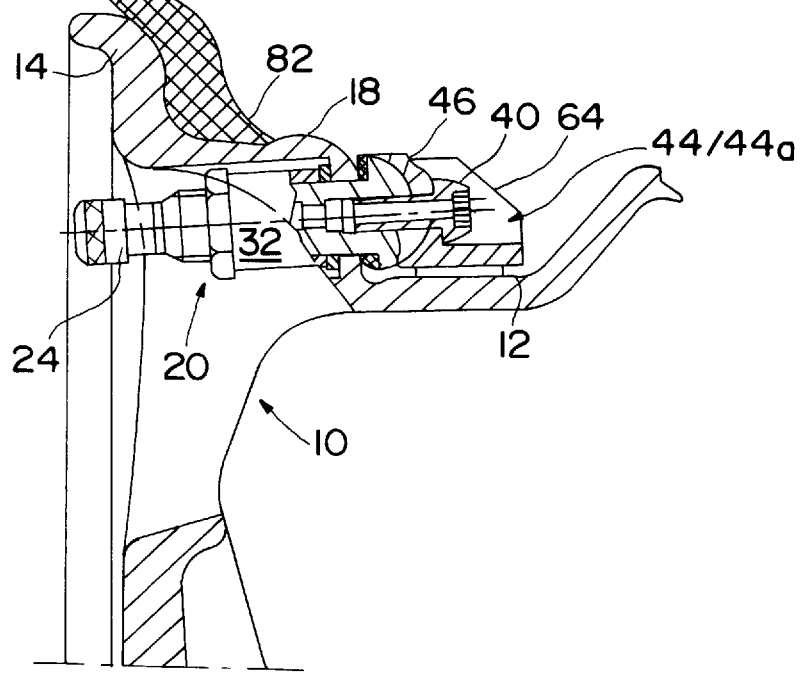
Figure 20:
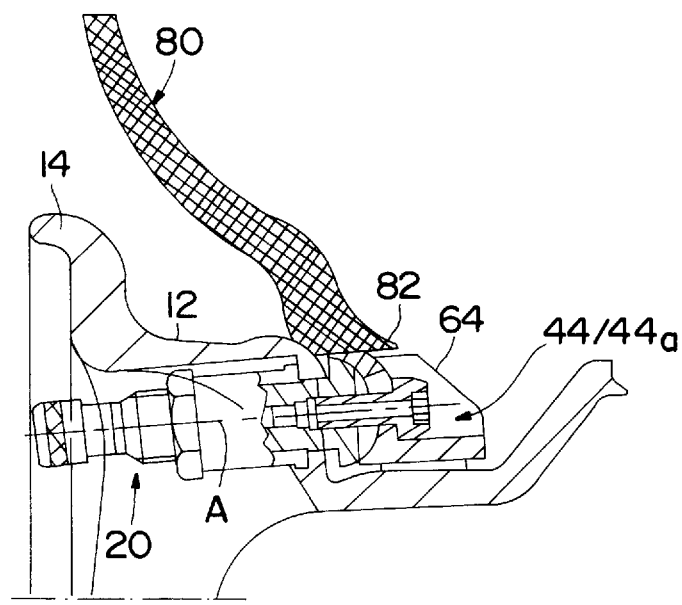
Figure 21:
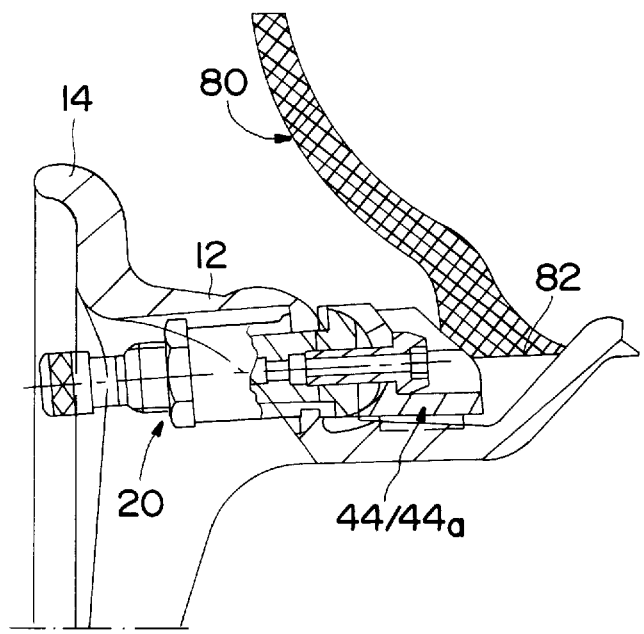

FIGS. 19 through 21 diagrammatically show different positions of a pneumatic tire 80; during removal thereof its annular tire bead 82 slides out of the rim bed 12 over the signal housing 44, 44$_a$ which is mounted by a three-point mounting assembly, on the valve base 27, 27$_a$, 27$_b$ and the base bar portions 52, 52$_a$, and its front inclined surfaces 64, without causing changes in position or even deformation on the signal housing 44, 44$_a$.

The invention thus provides a housing which can be fitted in variable ways for a power source and a measurement value sensor which are both carried directly on the tire valve 20 and which are protected from access from the exterior, in particular from fitting tools which are inserted into the rim space. If the above-mentioned central line B is in relation to weight the line of symmetry of the signal housing 44, the occurrence of unbalances due to same is substantially restricted.

We claim:

1. Tire pressure sensor apparatus for a pneumatic tire of a vehicle, which comprises: a tire rim having a rim bed; a tire valve for a pneumatic tire on said rim; a sensor means on said rim bed acted on by the tire pressure; said sensor means having transmitter means for interacting with receiver means outside of said tire; and said sensor means comprising a signal housing having at least two base elements for resting on said rim bed and for adjustably supporting said signal housing in a mounted state.

2. Apparatus according to claim 1, including an axial valve bore in the tire valve, wherein the signal housing is connected to the tire valve by a connecting element and is adjustable relative to said tire valve.

3. Apparatus according to claim 2, wherein said connecting element is a hollow screw with a head, and wherein the head of the hollow screw bears against the side of a longitudinal wall of the signal housing which is remote from the valve, the screw passing with clearance through the longitudinal wall.

4. Apparatus according to claim 3, wherein the longitudinal wall includes an opening for the hollow shank of the screw, which opening extends parallel to the end faces of the housing.

5. Apparatus according to claim 4, wherein said opening is a slot which is provided in a transverse wall parallel to the longitudinal wall.

6. Apparatus according to claim 3, including a contact surface of the signal housing having a configuration such that when the screw is tightened the signal housing is urged into the rim bed.

7. Apparatus according to claim 2, wherein said signal housing has an underneath surface towards the rim, and wherein projecting from said underneath surface are two base elements between which extends a plane defined by the axis of the connecting elements.

8. Apparatus according to claim 7, wherein the signal housing is mounted on the tire valve and on the two base elements, and wherein said two base elements are spaced from the tire valve and spaced from each other.

9. Apparatus according to claim 1, wherein the signal housing is cuboidal with narrow sides, and wherein the base elements are bar-like shaped portions in the region of the narrow sides of the cuboidal signal housing.

10. Apparatus according to claim 1, wherein the signal housing includes a transverse wall, and wherein a side of the transverse wall, which is remote from the valve, defines an apex groove with groove walls, the groove extending from a surface of the signal housing.

11. Apparatus according to claim 1, wherein a cavern is formed in the signal housing at the rear surface thereof, and the base of the tire valve is adjustably mounted in the cavern.

12. Apparatus according to claim 11, wherein the cavern is defined by a part-spherical surface which bears against a part-spherical peripheral surface of the valve base.

13. Apparatus according to claim 12, including a central rib extending into the cavern and delimited by part-spherical surfaces, said rib being fitted into a corresponding groove of the valve base.

14. Apparatus according to claim 11, wherein the cavern is in the form of a slot into which is fitted a valve base which is flat at both sides thereof, and wherein part-spherical surfaces are arranged in the slot at two mutually oppositely disposed sides, and wherein part-spherical surfaces of the valve base are disposed opposite said part-spherical surfaces in the slot.

15. Apparatus according to claim 11, wherein the cavern and the apex groove are provided in a projection portion on the signal housing, wherein the housing projection portion is arranged centrally on an approximately cuboidal base portion.

16. Apparatus according to claim 15, wherein lateral outside surfaces of the housing projection portion are inclined towards each other away from shoulder surfaces of the base portion.

17. Apparatus according to claim 15, wherein an insert space for an insert which is at least one of a power source and a measurement valve sensor, is arranged adjacent base elements in the base portion on both sides of a center line which crosses the longitudinal axis of the signal housing.

18. Apparatus according to claim 17, including fixing elements for the insert in the insert space.

19. Apparatus according to claim 17, wherein the center line is a straight line of symmetry of the signal housing.

20. Apparatus according to claim 19, wherein said signal housing includes a first surface which is adjacent the valve, and wherein said first surface is inclined outwardly at an angle from a bottom surface towards the projection portion on the housing.

21. Apparatus according to claim 20, wherein a surface of the projection portion of the housing is inclined in the same direction as the first surface and at an angle.

22. Apparatus according to claim 21, wherein the inclination of the surface of the projection portion of the housing, which is remote from the valve, is greater than the inclination of the first surface of the signal housing which is adjacent the valve.

23. Apparatus according to claim 1, wherein the length of the signal housing is between 50 mm and 70 mm.

24. Apparatus according to claim 1, wherein the ratio of width to length of the signal housing is approximately 1:2 to 1:3.

25. Apparatus according to claim 1, wherein the ratio of the total area of the signal housing to its length is 1:3 to 1:4.

26. Apparatus according to claim 1, wherein the ratio of the height of the base elements to the length of the signal housing is approximately 1:15 to 1:18.

27. Apparatus according to claim 1, wherein the signal housing is formed from a tough plastic material of low specific weight.

28. Apparatus according to claim 1, including two of said base elements.

* * * * *